March 5, 1957   J. HOHL ET AL   2,783,597
CLOSURES FOR GLASS CONTAINERS AND METHOD OF APPLICATION
Filed June 9, 1953

Inventors
JOHN HOHL
FRED G. PELLETT

By Rule & Hoge
Attorneys

United States Patent Office 2,783,597
Patented Mar. 5, 1957

2,783,597

CLOSURES FOR GLASS CONTAINERS AND METHOD OF APPLICATION

John Hohl and Fred G. Pellett, Toledo, Ohio, assignors to Owens-Illinois Glass Company, a corporation of Ohio Application June 9, 1953, Serial No. 360,466

6 Claims. (Cl. 53—16)

The present invention relates to improvements in closures for glass containers, such as bottles and jars and methods of applying such closures.

An important object of the present invention is the provision of novel and effective means to prevent the entrance of atmospheric oxygen into glass containers whereby to avoid discoloration of the product packed in such containers.

It is also an object of the present invention to provide a novel, distinctive and effective top seal which can be incorporated in conventional "crown" and "screw type" closures, in addition to those of the so-called "side seal" type.

It has been observed that in the packaging of heat-processed foods in glass containers in accordance with conventional practice and using standard containers and closures, many products become discolored in proximity to the closures within a period of a few weeks, or months and we have definitely ascertained that such discoloration results directly and solely from the entrance of atmospheric oxygen into the container.

Discoloration has been a very serious problem with food packers and has subjected them to serious loss aggregating hundreds of thousands of dollars worth of merchandise annually. Hence the importance of avoiding such discoloration is apparent.

We realize that the use of a rubber, or synthetic rubber, gasket material, having very low oxygen permeability, would reduce, or perhaps to a substantial degree, eliminate discoloration, but the fact is such material is too costly to be economical.

The sealing surface, at the upper end, or rim, of glass containers (bottles and jars) is uneven in varying degrees. Some such unevenness is rather pronounced taking the form of long waves generally at least several thousandths of an inch in height from trough to crest and usually superimposed on these waves is another type of unevenness in the form of small pits or depressions generally not deeper than aobut one thousandth of an inch. Heretofore any "top seal" (sealing at said rim) has utilized a comparatively thick cushion and facing liner placed in a shell, such as a "screw" or "crown" closure, on the theory that considerable thickness was absolutely essential to satisfactory sealing. Although liners of considerable thickness perhaps compensated for the major unevenness of the glass sealing surface, this has the disadvantage of separating the metal of the closure and glass of the container by a gap of considerable width which is filled with a material which allows permeation of vapors and gases. In other words, organic materials used as liners or gaskets in closures allow diffusion or permeation of gases and vapors, whereas metal and glass do not allow such passage. Obviously then, less permeation occurs when the space or gap between the metal and glass is reduced.

We accordingly have determined that if a closure consisting of a light gauge sheet metal shell and a suitable internal coating of properly selected resinous material and thickness is utilized, a perfect seal against the glass sealing surface can be effected.

We have discovered that if the closure is formed of sheet metal about .006 to .010 inch thick, the panel portion will, under sufficient and properly applied top pressure, conform to any major irregularities in the contour of the glass sealing surface, in contradistinction to the results of standard procedure in which no part of the panel of the closure ever tends to, or is expected to assume the contour of any major unevenness in the glass sealing surface. Hence we use a coating of minimum thickness, about .001 to .005 inch with far greater sealing effectiveness than when ordinary thick coatings, or liners, are utilized. In other words, great thickness of the coating, established or accepted practice and theory, notwithstanding, positively does not insure proper sealing, but rather contributes to, or promotes, leakage of atmospheric oxygen into the container, because, as stated heretofore, the thicker the coating (and it being pervious to oxygen passage), the greater the area between the glass and metal through which oxygen may enter.

Applicants also are fully aware of others' efforts to seal glass containers by using a resinous coating, or the like, interposed between the glass and a closure and applied either to the glass or closure, but it is quite evident that they have not appreciated, nor in fact understood the criticalness from the standpoint of sealing effectiveness, of holding to an absolute minimum, the thickness of the coating, or sealing film, utilized. Such is borne out by the fact that they invariably teach the need for a comparatively thick coating. For example in Staples Patent No. 2,390,501 issued December 11, 1945, the patentee specifies that the coating may be within the range of one to twenty thousandths of an inch thick. That is rather a wide range for such liners. The simple fact that he obviously considers a coating even approximating twenty thousandths of an inch thickness to be satisfactory, indicates conclusively, complete lack of any realization, or understanding, that the degree of oxygen permeability and consequent rate and extent of discoloration of the product increase as the cross-sectional dimension, or thickness of the coating is increased. Hence it is evident that he, as well as others, fails to appreciate that the thickness must be held to a minimum and be only sufficient to fill the microscopic imperfections in the glass sealing surface and provide only a very thin film between such surface and the closure, if an effective barrier to oxygen passage is to be obtained.

Such extreme thinness of the coating, as we utilize (about .001 to about .005 of an inch), is possible and wholly effective, only because it is used in conjunction with a sheet metal closure whose inherent flexibility permits molding of both the metal and coating to the major imperfections, or unevenness, in the glass sealing surface. Hence we do not rely solely upon the coating to compensate for all unevenness etc., in the glass surface. Thus we have completely and effectively disproved the general theory heretofore prevailing, that a thick coating, or liner, is necessary in order to provide a satisfactory seal.

In our closure a single coating, suitably bonded to the interior of the panel, or top portion of a sheet metal shell, serves the two-fold function of protecting the metal, or protecting the product against contact with the metal and providing effective sealing means between the glass and closure.

In the accompanying drawings wherein we have illustrated several adaptations of our invention:

Figures 1, 5, 6:
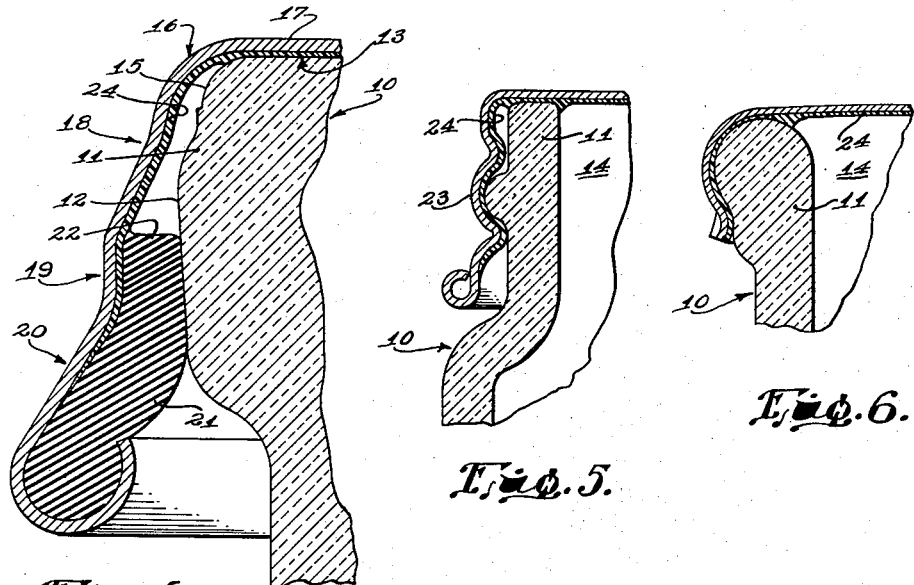
Fig. 1 is a fragmentary sectional view showing a closure of the so-called side seal type incorporating our top seal invention.
Fig. 5 is a sectional view of a screw closure incorporating our invention.
Fig. 6 is a sectional view of a "crown" closure incorporating our invention.
Figure 2:
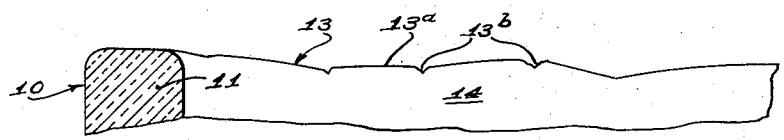
Fig. 2 is a fragmentary detail sectional view showing in exaggerated form, the character of unevenness frequently found in the sealing surface of glass containers.
Figure 3:
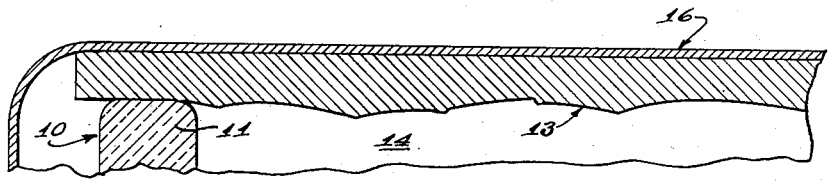
Fig. 3 is a fragmentary sectional view illustrating the comparatively thick liner generally used and supporting applicant's assertion that an increase in liner thickness merely provides additional space for leakage of oxygen.
Figure 4:
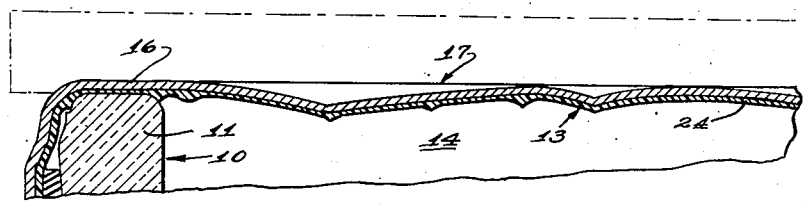
Fig. 4 is a fragmentary sectional view following the wall contour and showing the manner in which applicant's closure is deformed under top pressure to accommodate imperfections in the glass sealing surface.

Referring to that form of our invention illustrated in Figs. 1, 2, and 4, the glass container 10 includes a neck portion 11 having both a circumferential external side sealing surface 12, which tapers inwardly and downwardly and a top sealing surface or rim 13, facing upwardly about and defining the filling and discharge opening 14. The upper area 15 of the side portions may be reduced diametrically to facilitate application of the closure, as will be apparent. By tapering the side sealing surface downwardly and inwardly it exerts a continuous downward pull, or pressure on the closure, thereby mechanically holding the closure in place and supplementing atmospheric pressure, where the container has been vacuumized.

As shown in somewhat exaggerated form in Figs. 2 and 4 the top sealing surface, or rim 13, seldom is entirely free from some unevenness, including pits and recesses, etc., such surface often having both major irregularities 13ª and pits 13ᵇ, or such imperfections, all of which must be compensated for by the closure and method of applying same.

Hence the closure should accommodate itself to all such irregularities or unevenness to the maximum degree, if a satisfactory seal is to be obtained.

Accordingly, this closure 16 is formed of thin sheet metal such that when applied under suitable mechanical top pressure and/or mechanically retained, the panel, or top portion 17 will flex and accommodate, or mold itself to at least the major or more pronounced irregularities of the glass sealing surface. Included in the closure 16 is a depending annular attaching skirt 18, or flange, composed of an upper gasket constricting part 19 and a flared lower part 20 in which a sealing gasket 21 is secured against bodily movement axially of the closure. The upper portion 22 of this gasket is adapted to be compressed between the constricting part 19 of the closure and said tapered sealing surface 12 of the glass container. Thus, this gasket provides an outer seal and performs the added function of mechanically securing the closure in place by exerting a continuous downward pull on said closure.

To compensate for and completely fill in and effectively seal the pits, recesses, in the top sealing surface of the glass, the interior surface of the closure including the panel 17 and if desired, the skirt down to a point slightly below the upper end of the gasket 21, is suitably coated with a resin, preferably of the vinyl, or oleoresinous type. Thus, when the closure is applied to the container, whether held by vacuum, or mechanically, or both, the resin enters and seals all of the smaller imperfections, or pits and the panel portion of such closure flexes at the necessary points, or zones and thereby accommodates itself to the major or more pronounced irregularities. As a consequence, an overall perfect seal is effected.

With particular reference to the coating, it must be sufficiently thick that when in final sealing position, it will completely compensate for all said minor unevenness, yet provide a thin film immediately between the metal of the closure and the glass sealing surface at all points along said surface. In other words, there is no metal to glass contact and the film need be only thick enough to prevent such contact. To this end we have determined that the coating, in order to be so effective, yet not be present in an excessive amount and in fact permit more ready transmission of atmospheric oxygen should be from about .001 to about .005 of an inch thick.

Such a coating must be sufficiently soft to take a good imprint of the entire glass sealing surface under conditions of heat processing of the packaged product, yet not so soft that it can be completely displaced laterally under top pressure and processing, sufficiently to permit leakage. As an example, we have produced an "organisol" type coating which meets these requirements, such consisting for example of ten (10) parts by weight of finely divided powdered polyvinyl chloride resin; nine (9) parts octyl diphenyl phosphate plasticiser; and two (2) parts solvent, the latter being coal tar, naphtha, or a semi-aromatic solvent derived from petroleum; all of these components being mixed mechanically, or ground together in a pebble mill.

In applying such a coating, the metal plate from which the closure is formed, is suitably sized to provide a surface for adhesion to the final coating, as by the application of a thin film of a conventional coating such as a solvent dispersed vinyl resin, or vinyl resin modified with phenolaldehyde resin. This sizing film is baked for a period of about twelve (12) minutes at about 375° F., and thereafter the "organisol" type coating is applied in sufficient quantity to produce a film of about .001 to .005 of an inch thick, following a baking operation.

Because we have utilized a light gauge sheet metal shell in producing our closure and taken full advantage of its inherent flexibility as a means to accommodate the panel portion to major irregularities, or unevenness, in the glass sealing surface, the thickness of the interior coating may be within the range specified. It need be, and to be effective, should be, only thick enough to fill in the pits, etc., and provide a thin film between the metal of the closure and the glass.

In practice, the closure may be applied by the application of top pressure, utilizing a conventional soft faced anvil A, which will deform both the closure panel, or top portion and the coating, so as to insure effective molding or conformance of these elements to the irregularities of the glass sealing surface.

As will be observed in Fig. 4, such pressure may reduce the coating immediately between the higher areas of the glass and the metal to a rather thin film. At each margin of such thin film, the coating may be of somewhat increased thickness.

In Fig. 5 the closure is provided with screw threads 23 which engage corresponding threads on the glass container. The coating 24 is applied and functions in the same manner as does the coating illustrated and described heretofore.

In Fig. 6 our invention is illustrated as incorporated in a conventional "crown" type cap.

Modifications may be resorted to within the spirit and scope of the appended claims.

We claim:

1. A sheet metal closure comprising a deformable top portion of a thickness between about .006 and about .010 of an inch, a depending attaching skirt and a deformable plastic coating secured to the interior of said top portion in at least an annular zone in proximity to the juncture of the top portion and skirt, the coating being of a thickness less than about .005 of an inch.

2. A closure as defined in claim 1 wherein the skirt has a flared lower portion and an annular sealing gasket for engagement with an external side sealing surface of a glass container.

3. A closure as defined in claim 1 wherein the coating extends over the entire interior surface of said top portion and downwardly over at least a part of said skirt.

4. In combination, a glass container having a wall defining a mouth and providing a continuous top sealing surface at its outer end and a continuous external side sealing surface spaced below said outer end, a sheet metal closure having a readily deformable top portion of a thickness between about .006 and about .010 of an inch, a depending attaching skirt at the margin of said top portion, a sealing gasket secured within the closure along a lower portion of said skirt for engagement with the side sealing surface, and a deformable plastic coating attached to the underside of said top portion and of a thickness less than approximately .005 inch for sealing contact with the top sealing surface.

5. In the method of hermetically sealing a glass container having a continuous top sealing surface, with a sheet metal closure including a readily flexible top portion coated internally with a resinous sealing film having a thickness of less than .005 inch, the steps of bringing the sealing film into contact with the top sealing surface, mechanically applying top pressure to the closure sufficient to deform the top portion into substantial conformity to any major unevenness in the top sealing surface and causing the resinous coating to also fill in microscopic imperfections in said sealing surface and securing the closure in position to maintain the seal.

6. In the method of hermetically sealing a glass container having a continuous top sealing surface, with a sheet metal closure including a readily flexible top portion of a thickness less than approximately .010 inch coated internally with a resinous sealing film of less than about .005 inch thick, the steps of bringing the sealing film into contact with the top sealing surface, mechanically applying top pressure to the closure sufficient to deform the top portion into substantial conformity to any major unevenness in the top sealing surface and causing the resinous coating to also fill in microscopic imperfections in said sealing surface and securing the closure in position to maintain the seal.

References Cited in the file of this patent

UNITED STATES PATENTS

| | | |
|---|---|---|
| 1,082,696 | Hicks | Dec. 30, 1913 |
| 1,696,555 | Podel | Dec. 25, 1928 |
| 1,956,210 | Booth | Apr. 24, 1934 |
| 1,966,273 | Waring | July 10, 1934 |
| 2,409,789 | Osborne | Oct. 22, 1946 |
| 2,481,111 | Griswald | Sept. 6, 1949 |